United States Patent [19]

Mizuno

[11] 4,076,093

[45] Feb. 28, 1978

[54] BRAKING CONTROL APPARATUS FOR A VEHICLE

[75] Inventor: Akira Mizuno, Kariya, Japan

[73] Assignee: Goshi Kaisha Mizuno Kogeisha, Japan

[21] Appl. No.: 729,078

[22] Filed: Oct. 4, 1976

[30] Foreign Application Priority Data

Mar. 31, 1976 Japan .................................. 51-35700
May 21, 1976 Japan .................................. 51-59421
Jul. 1, 1976 Japan .................................. 51-78010

[51] Int. Cl.² .............................................. B60T 7/02
[52] U.S. Cl. .................................. 180/82 R; 180/111; 188/265; 192/.049; 192/3 TR; 200/61.89; 340/69
[58] Field of Search .......... 180/82 R, 103 R, 103 BF, 180/111; 188/265; 192/.049, 3 TR, 13 A; 340/69; 303/89; 200/61.89

[56] References Cited

U.S. PATENT DOCUMENTS

| | | | |
|---|---|---|---|
| 1,976,471 | 10/1934 | Adams | 188/265 X |
| 2,285,369 | 6/1942 | Smith | 192/3 TR |
| 2,910,156 | 10/1959 | Apple | 192/3 TR |
| 3,434,575 | 3/1969 | Mizuno | 192/3 TR |
| 3,498,426 | 3/1970 | Nakano | 192/13 A |
| 3,684,049 | 8/1972 | Kimura | 188/265 |
| 3,726,369 | 4/1973 | Esteves | 192/3 TR |

*Primary Examiner*—Kenneth H. Betts
*Attorney, Agent, or Firm*—Craig & Antonelli

[57] ABSTRACT

A braking control apparatus for a vehicle which locks and holds the brake pedal of the vehicle in a given depressed position. The apparatus is rendered inoperative when the vehicle is in such a condition that the locking and holding of the brake pedal is undesirable. When starting the vehicle, an accelerator pedal switch operatively connected to the accelerator pedal deenergizes an electromagnet for locking the brake pedal. With the brake pedal locked in any given depressed position, any further depression of the brake pedal results in deenergization of the electromagnet by the brake pedal switch operatively connected to the brake pedal. With the vehicle at rest, when the door is opened, the electromagnet is deenergized by a door switch. Also, during rapid braking of the vehicle, another brake pedal switch which is operatively connected to the brake pedal actuates a latching relay to deenergize the braking control apparatus.

10 Claims, 15 Drawing Figures

DIRECTION OF BRAKING ACTION

BRAKING CONTROL APPARATUS FOR A VEHICLE

BACKGROUND OF THE INVENTION

1. Field of the Invention

The present invention relates to improvements in and relating to braking control apparatus for vehicles such as automotive vehicles.

2. Description of the Prior Art

It is troublesome for the driver of a vehicle to operate the hand brake or continuously depress the brake pedal to facilitate the driving operation of the vehicle when starting on a slope, prevent his vehicle at rest from colliding into the preceding vehicle from behind causing a double collision when his vehicle is collided from behind, prevent the vehicle from being moved forward due to a creeping phenomenon of the vehicle equipped with a torque converter and so on. As a means of overcoming these difficulties, a braking control apparatus has been proposed in the art in which once the brake pedal of a running vehicle has been depressed thus braking and bringing the vehicle to a stop, the brake pedal is locked in the depressed position by the energization of an electromagnet so that the depression of the brake pedal is maintained and thus the brakes continue to hold until the accelerator pedal is next depressed. While the conventional apparatus of this type has great advantages, it is disadvantageous in that when it is desired to depress further the brake pedal held in the previously depressed position by the electromagnet so as to apply the brakes harder, it is essential to depress the brake pedal against the electromagnetic force of the electromagnet thus requiring a considerably large amount of brake-pedal pressure.

Another disadvantage in practical use is that if the driver who overestimates the braking action of this apparatus steps out of the vehicle without applying the hand brake, there is the possibility of a situation arising in which when any fault occurs in the electric system so that the energizing current to the electromagnet is interrupted or reduced, the braking of the vehicle is partially lost thus causing an unforeseen accident.

Still another disadvantage is that when a fault occurs in the electronic or electric circuitry of the apparatus so that it can no longer perform the function of rendering the electromagnet inoperative during the time that the vehicle is in motion, the brake pedal will be locked in the depressed position by the electromagnet even when the vehicle is moving with the result that particularly when the brake pedal is depressed fully to rapidly brake the vehicle, even if the foot is lifted off the brake pedal, the rapid braking of the vehicle is maintained and thus the wheels remain locked giving rise to a very dangerous situation.

SUMMARY OF THE INVENTION

With a view to overcoming the foregoing difficulty, it is an object of this invention to provide a braking control apparatus wherein when the brake pedal is depressed again to increase the braking force, the energization of the electromagnet locking the brake pedal is interrupted or reduced to facilitate the depression of the brake pedal.

It is another object of this invention to provide a braking control apparatus wherein there is provided a door switch which is operatively connected to the vehicle doors so that the opening of the door brings the door switch into operation to deenergize the electromagnet, whereby when the driver steps out of the vehicle, the locking of the brake pedal by the electromagnet is released automatically thus preventing the occurrence of any accident due to the driver's over-estimation of the ability of the apparatus.

It is still another object of this invention to provide a braking control apparatus which is capable of preventing the occurrence of a dangerous situation in which when the vehicle is braked rapidly while it is moving, even if the foot is lifted off the brake pedal, the brakes continue to hold due to erroneous energization of the electromagnet.

In accordance with this invention, there is thus provided a braking control apparatus for a vehicle which is capable of locking the brake pedal in any given depressed position, wherein the apparatus is rendered inoperative when the vehicle is in such a condition that the locking of the brake pedal is undesirable. Thus, the apparatus of this invention has a great advantage that driving safety of the apparatus is improved and the driving operation is made easier.

Other objects, features and advantage of the present invention will become apparent from considering the following detailed description in conjunction with the accompanying drawings.

DESCRIPTION OF THE PREFERRED EMBODIMENTS

Before describing the apparatus of this invention, the prior art braking control apparatus shown in FIGS. 1 through 7 will be described first.

Figure 1:
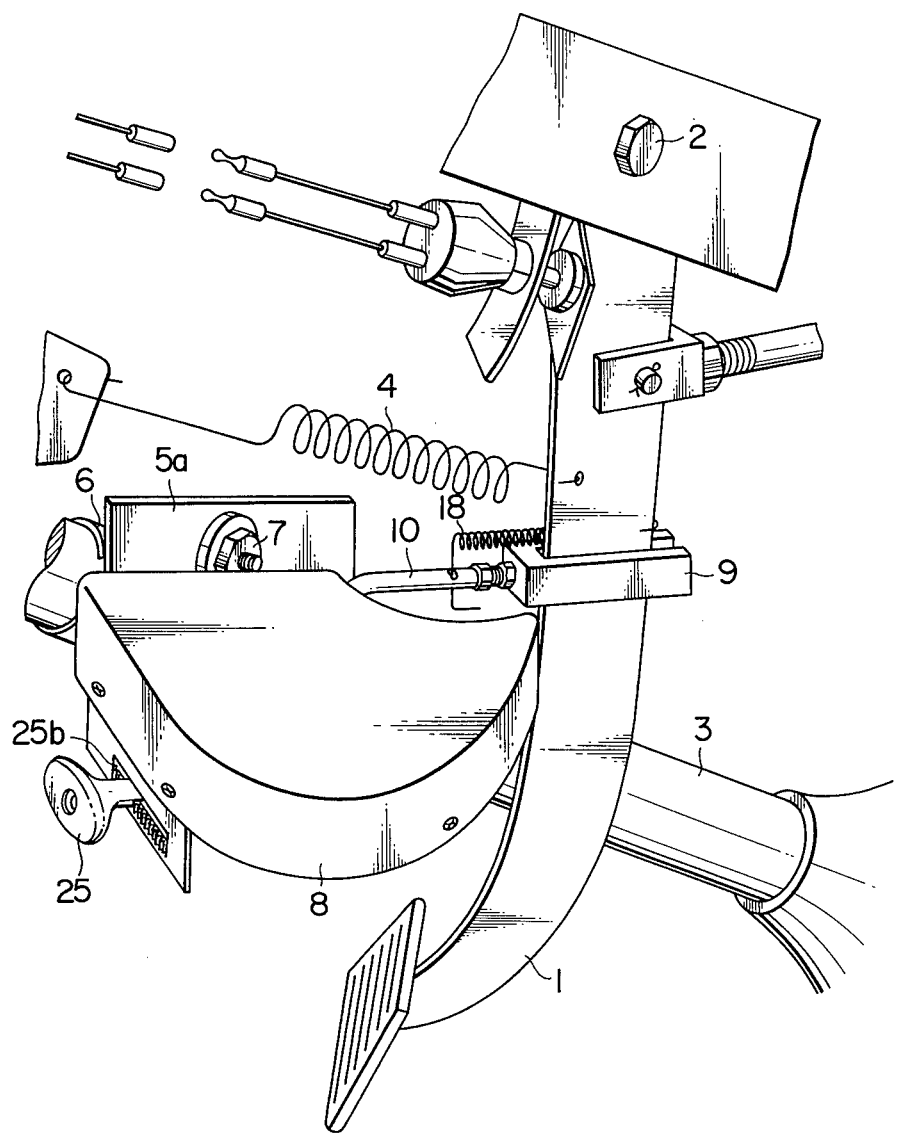
FIG. 1 is a perspective view of a conventional apparatus, showing its principal component parts arranged near the brake pedal.
Figure 2:
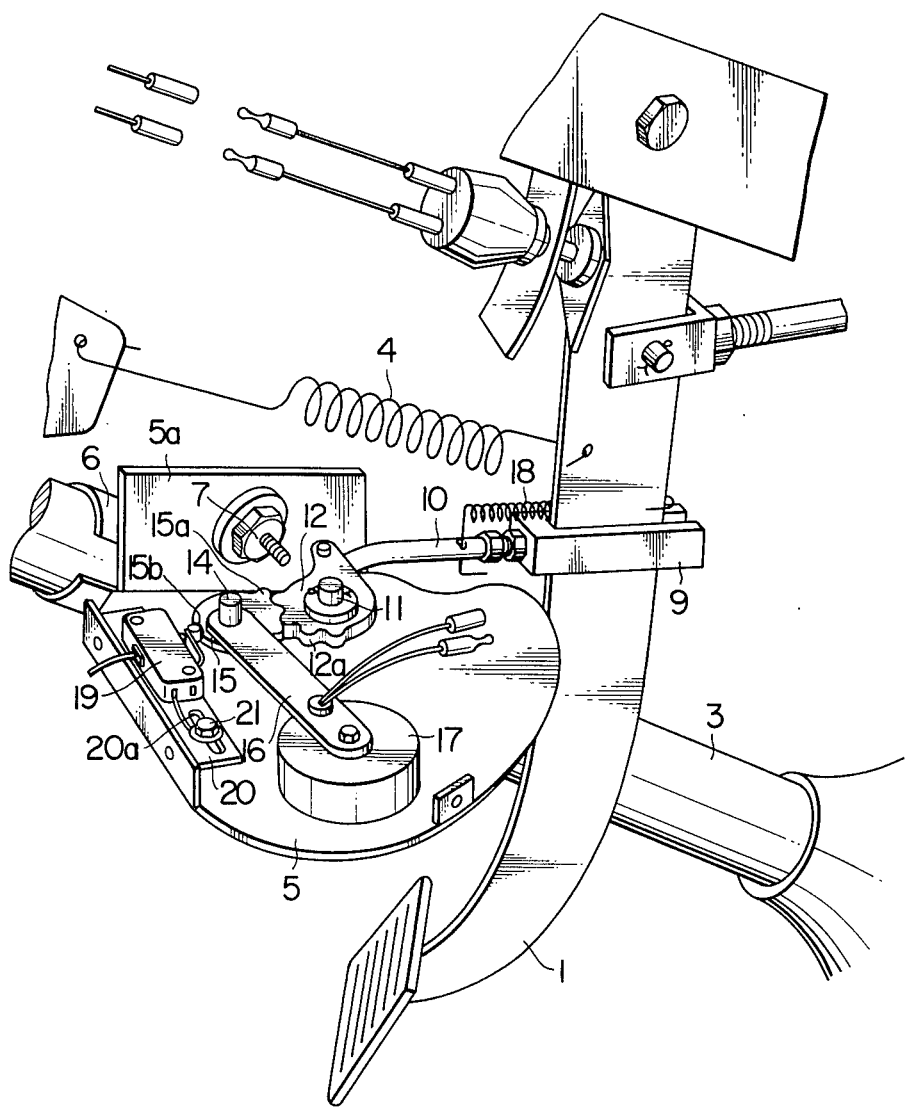
FIG. 2 is a perspective view of the conventional apparatus, showing the principal component parts with the cover of the locking plate taken away.
Figure 3:
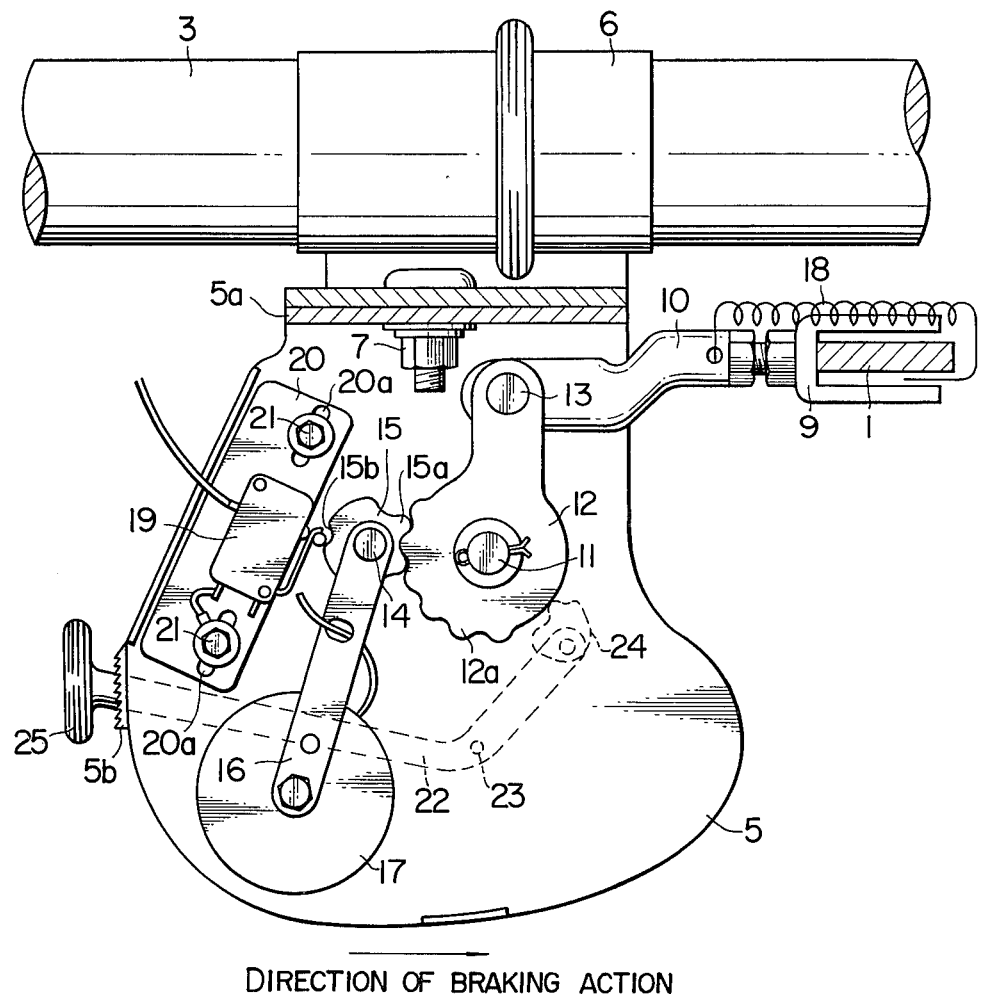
FIG. 3 is a plan view of the conventional apparatus viewed from a direction perpendicular to the locking plate, showing the apparatus with the cover of the locking plate taken away.
Figure 4:
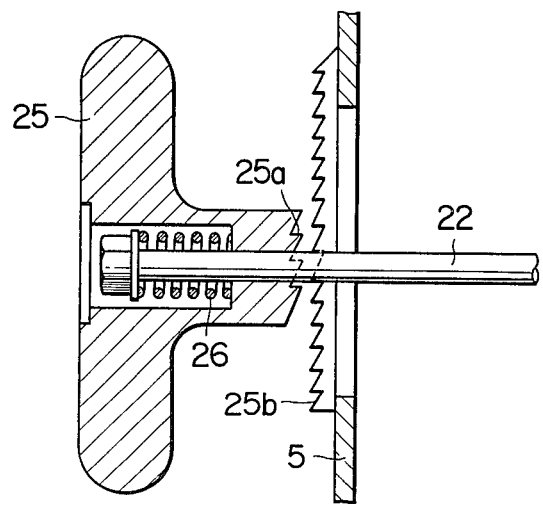
FIG. 4 is a partial sectional view of the conventional apparatus, showing the handle of the manual locking device and the parts associated therewith.

Referring to FIGS. 1 to 3, numeral 1 designates a brake pedal pivotable about a bolt 2 serving as a fulcrum, 3 a steering post, 4 a spring for returning the brake pedal, 5 a locking plate which is formed, as shown in FIGS. 2 and 3, into a flat shape on the whole having a part of its outer peripheral portion bent to form a bent portion whose part 5a in turn is secured to a metal mount 6. The metal mount 6 is fixedly mounted on the steering post 3 thus firmly holding the locking plate 5 in place on the vehicle body. Numeral 7 designates a bolt and a nut fastening the locking plate 5 to the metal mount 6. In FIG. 1, numeral 8 designates a cover screwed to the bent portion of the locking plate 5 and FIGS. 2 and 3 show the apparatus with the cover 8 taken away. Numeral 9 designates a forked connecting member having its forked end fitted on the brake pedal 1 and its base portion secured to a rod 10. As shown in FIGS. 2 and 3, the other end of the rod 10 is connected by a pin 13 to a rotary member 12 which in turn is movably mounted on a shaft 11 projected from the locking plate 5. Teeth 12a are formed on a part of the outer periphery of the rotary member 12 and the teeth 12a are in mesh with teeth 15a of another rotary member 15 which is movably mounted on a shaft 14 projected from the locking plate 5. The teeth 15a are formed on a part of the outer periphery of the rotary member 15 and the rotary member 15 is provided with a cam portion 15b formed on its portion having no teeth. Numeral 16 designates an arm having its one end fixedly mounted on the rotary member 15 and its other end attached to an electromagnet 17 whose attracting surface is spaced away from the plane surface of the locking plate 5 by a certain gap. Numeral 18 designates a spring for normally pressing the connecting member 9 against the brake pedal 1. Numeral 19 designates a microswitch fixedly mounted on a mounting plate 20 and its actuator is engaged with the cam portion 15b of the rotary member 15 so as to be opened and closed in response to the rotary movement of the rotary member 15. The mounting plate 20 is provided with a slot 20a so that the mounting plate 20 is attached to the plane surface of the locking plate 5 and thus its position is adjustable within the extent of the length of the slot 20a. In FIG. 3, numeral 22 designates a manual locking lever which is rotatably mounted on a pin 23 projected from the locking plate 5 and the manual locking lever 22 is provided at its one end with a pawl 24 adapted for engagement with the teeth formed on a member (not shown) which is fixedly mounted on the rotary member 12 for rotation therewith and at its other end with a handle 25. As shown in FIG. 4, the handle 25 is fitted on the lever 22 so as to be slidable in the lengthwise direction of the lever 22 (from side to side in the Figure) and it is also biased by a spring 26 to the right in the Figure. Also in FIG. 4, the handle 25 is provided at its right end with a portion 25a having teeth inclined in one direction to engage with an inclined toothed portion 25b which is formed on the end of the locking plate 5. With this construction, while, in FIG. 3, the lever 22 may be easily rotated counterclockwise about the pin 23 through the operation of the handle 25, the clockwise rotation of the lever 22 is normally prevented by the toothed portions 25a and 25b which are in mesh with each other. In FIG. 2, the manual locking lever mechanism and its associated parts are not shown for purposes of simplicity. The microswitch 19 is positioned so that when the brake pedal is depressed in excess of a predetermined amount, it is actuated and closed by the cam portion 15b of the rotary member 15.

Figure 5:
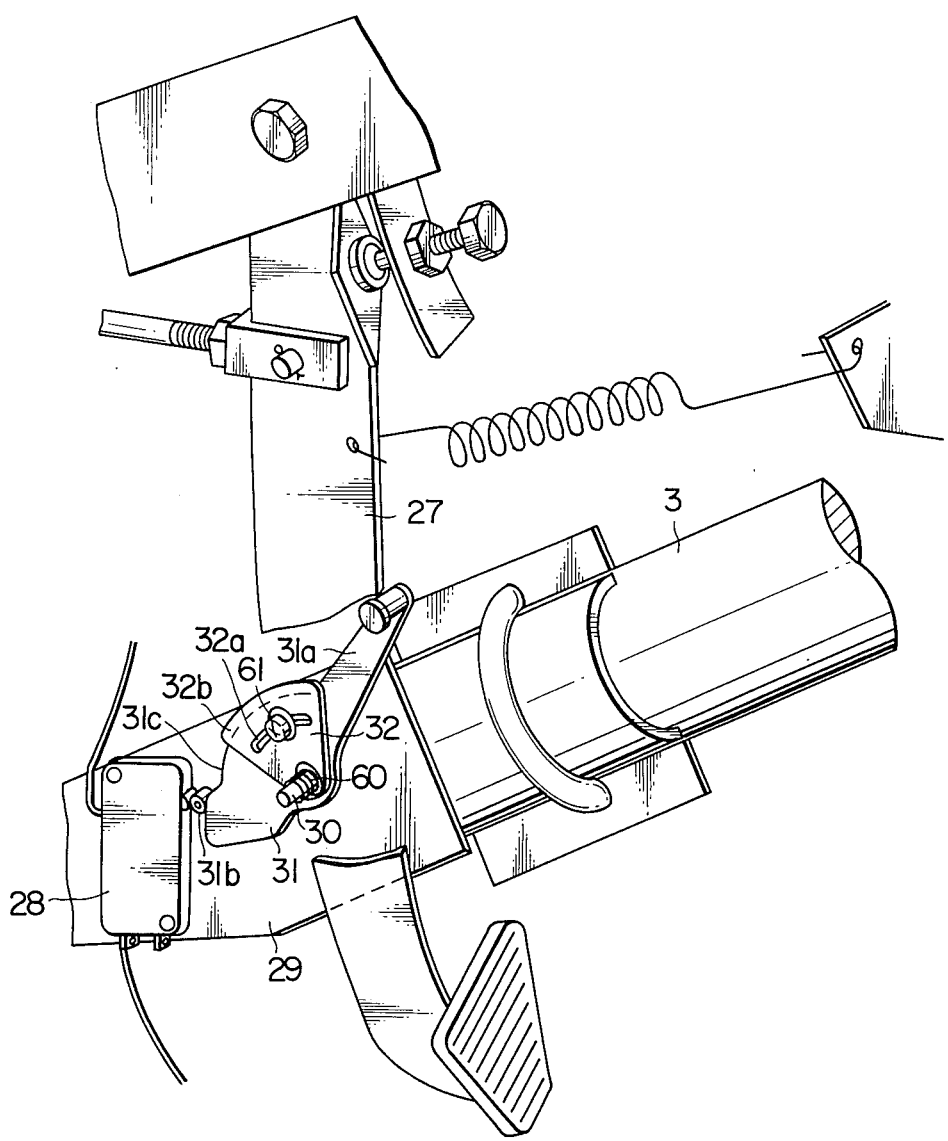
FIG. 5 is a perspective view of the conventional apparatus, showing the principal parts associated with the switch operatively connected to the clutch.
Figure 6:
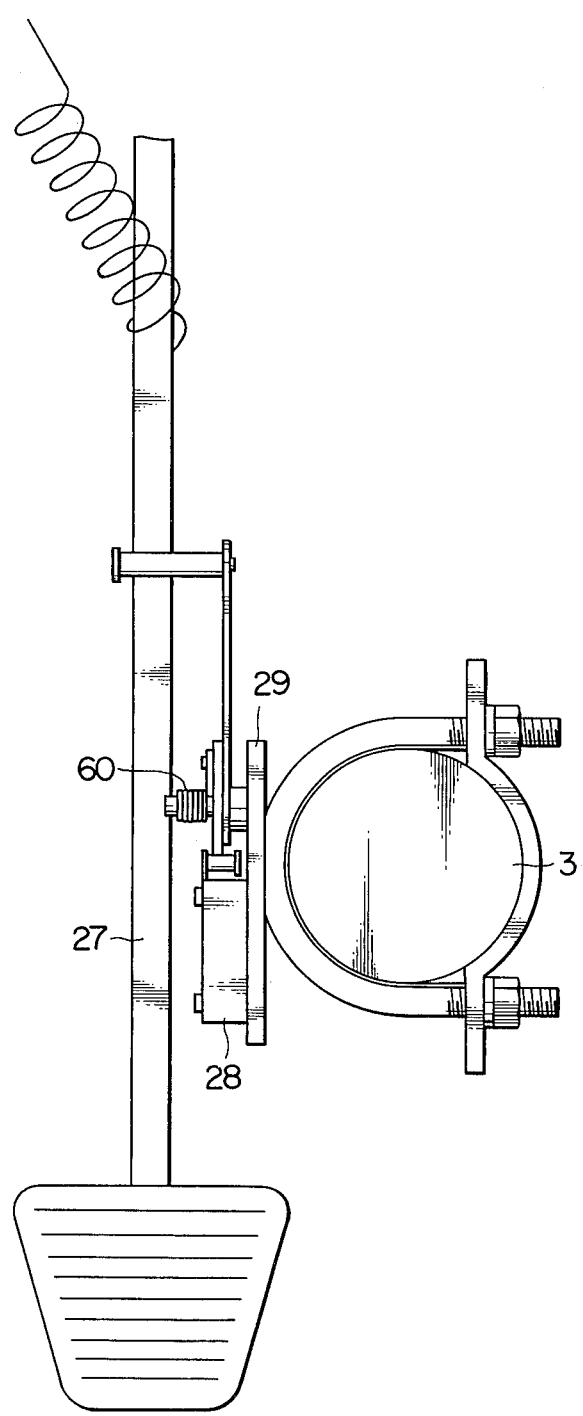
FIG. 6 is a front view of the principal parts shown in FIG. 5.

Referring now to FIGS. 5 and 6, numeral 27 designates a clutch pedal and a microswitch 28 is fixedly mounted on one side of a metal mount 29 attached to the steering post 3. A cam 31 having an arm 31a is rotatably fitted on a pin 30 projected from the metal mount 29 and the cam 31 is biased by a spring 60 so as to be normally pressed against the clutch pedal 27. A control cam 32 having a cam face 32a is attached by a bolt 61 to the other surface of the cam 31. The control cam 32 is provided with a hole which is engaged with the pin 30 and it is also provided with a curved slot 32a which is engaged with the bolt 61. Thus, by loosening the bolt 61, the control cam 32 may be rotated about the pin 30 through a certain angle. The cam 31 includes cam faces 31b and 31c adapted for engagement with the microswitch 28 and the height of the cam face 31b is selected equal to that of the cam face 32b of the control cam 32. Consequently, while, in the position of FIG. 5, the cam face 31b is engaged with the microswitch 28 closing the latter, the cam face 31c engages with the microswitch 28 in response to a slight depression of the clutch pedal 27 thus opening the microswitch 28 and a further depression of the clutch pedal 27 brings the cam face 32b of the control cam 32 into engagement with the microswitch 28 thus closing again the microswitch 28.

Figure 7:
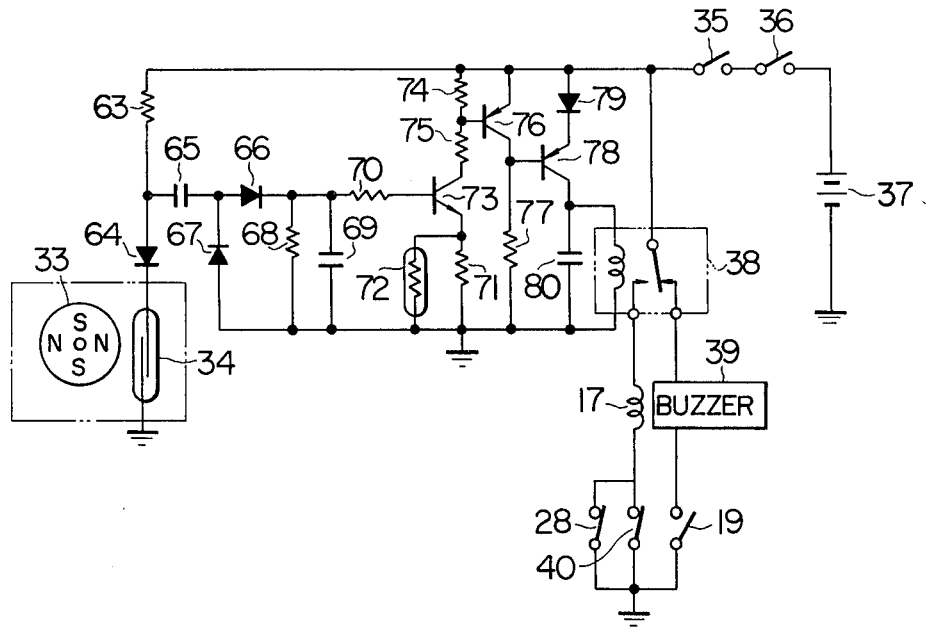
FIG. 7 is a circuit diagram of the conventional apparatus.

In FIG. 7, numeral 33 designates a permanent magnet which is mounted on the shaft of the vehicle such as the propeller shaft for rotation in accordance with the rotation of the wheel, 34 a reed switch positioned adjacent to the permanent magnet 33 and having its one end connected to the positive terminal of a power source 37 through a diode 64, a resistor 63, a main switch 35 and a key switch 36 and its other end grounded. The negative terminal of the power source 37 is also grounded. Numeral 38 designates a relay, 39 a buzzer, 40 a switch operatively connected to the accelerator pedal (not shown) so that its contacts are opened in response to the depression of the accelerator pedal.

Assuming now that the vehicle is in motion, the permanent magnet 33 is rotating and the reed switch 34 is turned on and off. Thus, when the reed switch 34 is turned off, a capacitor 65 is charged through the resistor 63 and a diode 66, whereas when the reed switch 34 is turned on, the charge on the capacitor 65 is discharged through the reed switch 34 and the diodes 64 and 67, and this process is repeated. The AC component of the speed signal thus generated at the terminal of the capacitor 65 is rectified by the diode 66, smoothed out by a smoothing circuit comprising a resistor 68 and a capacitor 69 and then applied to the base terminal of a transistor 73 having connected thereto a base resistor 70, an emitter resistor 71 and a temperature compensating thermistor 72. Consequently, when the vehicle is in motion, the base current flows to the transistor 73 so that the transistor 73 is turned on and the base current also flows to the following transistor 76 through its collector resistors 74 and 75 thus turning it on. When the transistor 76 is fully turned on, the voltage across a resistor 77 is increased and thus the final stage transistor 78 is turned off. In other words, the transistor 78 operates as a phase inverting amplifier. Numeral 79 designates a biasing diode, 80 a capacitor connected in parallel with the coil of the relay 38. The coil of the relay 38 is inserted in the collector circuit of the final stage transistor 78 and the relay 38 has the common contact of its transfer contacts connected to the positive terminal of the power source 37 through the main switch 35 and the engine key switch 36, the normally open contact connected to the electromagnet 17 and the normally closed contact connected to the buzzer 39. Consequently, when the vehicle is in motion, the transistor 78 remains off and thus the electromagnet 17 is not energized.

With the construction described above, the operation of the circuitry of FIG. 7 as a whole will now be described.

When the brake pedal 1 is depressed, the brakes are applied so that the vehicle is slowed down and brought to a stop. During this deceleration operation, if the amount of the depression of the brake pedal 1 is less than a predetermined amount, the switch 19 remains off and the buzzer 39 does not produce a buzzing sound. On the other hand, when the amount of the depression of the brake pedal 1 during the deceleration operation of the vehicle is greater than the predetermined amount, the switch 19 is turned on and the buzzer 39 produces a buzzing sound and the driver is informed of the fact that the depression of the brake pedal 1 has been positively accomplished. When the vehicle is brought to a complete stop, the reed switch 34 is no longer turned on and off so that the final stage transistor 78 is turned on and the relay 38 is energized. Consequently, while the transfer contacts of the relay 38 are changed from their illustrated positions, the circuitry is so constructed that the time of transfer of the contacts is slightly delayed from the time of complete stopping of the vehicle. In other words, the constant of the circuit including the capacitor 69 is selected so that after the vehicle has been stopped completely, the charge on the capacitor 69 is discharged through the base of the transistor 73 and thus the transistor 73 is turned on for a period of about 2 seconds, for example, and consequently at the expiration of about 2 seconds after the complete stopping of the vehicle, the relay 38 changes its position thus energizing the electromagnet 17. As a result, when the brake pedal 1 is depressed to an extent greater than a predetermined amount to decelerate the vehicle, the switch 19 is closed and thus the buzzer 39 continues to produce a buzzing sound until the lapse of about 2 seconds after the complete stopping of the vehicle, after which the electromagnet 17 is energized and attracted to the locking plate 5 with the result that even if the driver lifts his foot off the brake pedal 1, the brake pedal 1 is continuously held in the previously depressed position and thus the brakes continue to hold.

Next, to start the vehicle, the clutch pedal 27 is first depressed to the full extent. In this case, since the switch 28 remains closed as mentioned previously and the brakes still continue to hold. It is to be noted here that while there are instances where the switch 28 is opened during the time that the clutch pedal 27 is being depressed to the full extent as mentioned earlier, in this case the brakes continue to hold since the accelerator pedal is not depressed at all and the switch 40 remains closed thus energizing the electromagnet 17 continuously. Then, the shift lever (not shown) is operated and the accelerator pedal is depressed thus opening the switch 40. Thereafter, when the clutch pedal 27 is gradually released while depressing the accelerator pedal further, the switch 28 is also opened and the electromagnet 17 is deenergized thus causing the electromagnet 17 to lose its attractive power and thereby releasing the brakes. In this case, the amount of depression of the clutch pedal 27 is related to the operating position of the switch 28 in such a manner that the time of the clutch discs starting to meet coincides with the time that the switch 28 is opened and in this way the driving operation for starting the vehicle on a slope is facilitated.

The size of the parts of the rotary members 12 and 15 and the arm 16 are selected so as to magnify the movement of the brake pedal 1 which is transmitted through the forked connecting member 9.

In other words, these sizes are so selected that assuming that A represents the distance between the shaft 11 and the pin 13, B represents the distance from the shaft 11 to the pitch circle of the teeth 12a, C represents the distance from the shaft 14 to the pitch circle of the teeth 15a and D represents the distance between the shaft 14 and the electromagnet 17 or the length of the arm 16, the following relation holds:

$$D \cdot B > A \cdot C$$

or $$D > A, B > C$$

In this way, it is possible to positively lock the brake pedal in its depressed position against its reaction force which is usually as large as 20 to 30 Kg by means of a relatively small electromagnet.

The manual locking mechanism shown in FIGS. 1 and 3 may be used in the following manner, namely, with the brake pedal 1 depressed and held in the depressed position by the electromagnet 17, by pulling the handle 25 toward the observer in FIG. 1 so that the pawl 24 engages with the teeth formed on the member attached to the rotary member 12 for rotation therewith thus mechanically locking the rotary member 12, it is possible to cause the applied brakes to continue to hold even if the power source is disconnected. To release this mechanical lock, it is necessary to allow the handle 25 to slide upward while pulling it to the left in FIG. 4 against the force of the spring 26.

Next, the preferred embodiments of the invention will be described with reference to the accompanying drawings.

Figure 8:
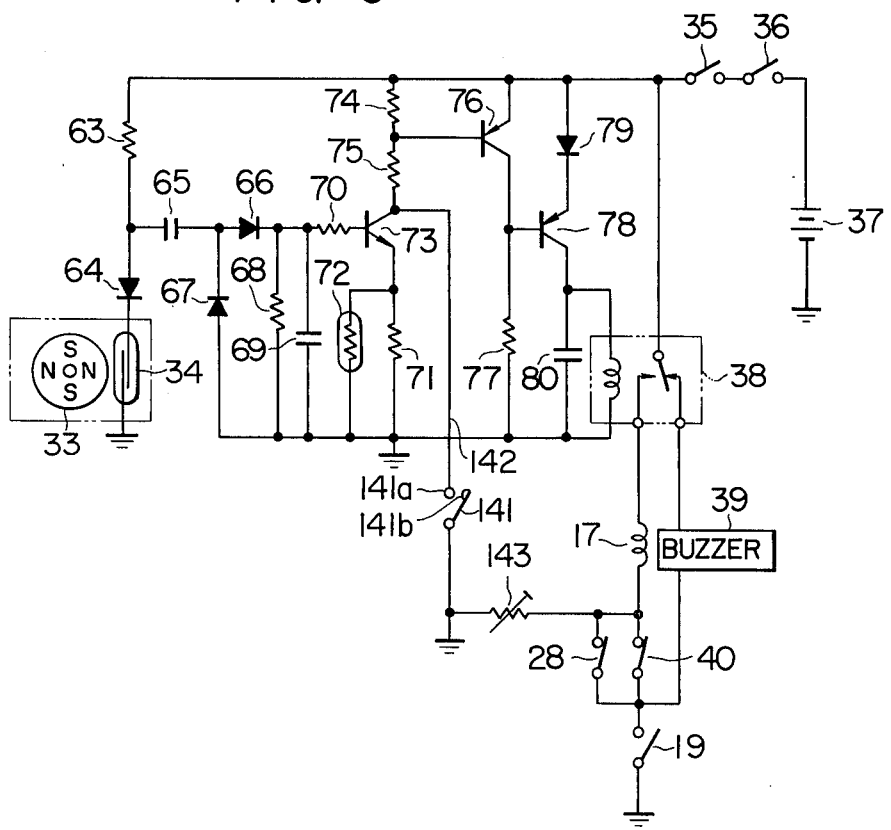
FIG. 8 is a circuit diagram of a first embodiment of the invention.

Referring to FIG. 8, there is illustrated a first embodiment of the invention in which the invention is applied to the above-described braking control apparatus shown in FIGS. 1 through 7. In the Figure, the collector of the transistor 73 is grounded through a switch 141. The ends of the microswitch 28 operatively connected to the clutch pedal 27 and the switch 40 operatively connected to the accelerator pedal which are not connected to the electromagnet 17, are connected to the junction point of the buzzer 39 and the microswitch 19 as shown in the Figure. The junction point of the electromagnet 17 and the microswitch 28 and that of the electromagnet 17 and the switch 40 are grounded through a pre-set resistor 143. The remainder of this embodiment is the same with the corresponding circuit construction of FIG. 7. As will be described later, the switch 141 is one whose contacts are closed in response to only a slight depression of the brake pedal 1.

Figure 9:
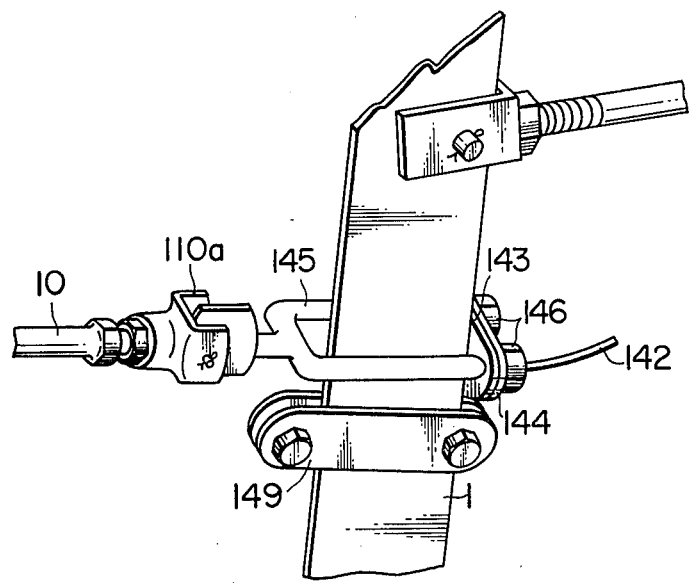
FIG. 9 is a perspective view showing the details of the component parts arranged near the switch of this invention which is operatively connected to the brake pedal.
Figure 10:
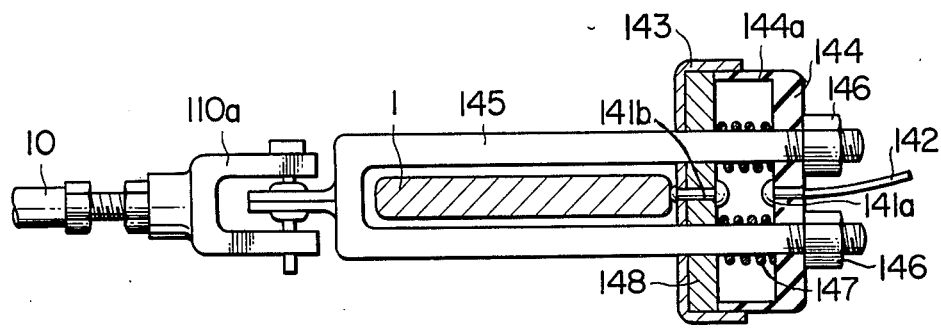
FIG. 10 is an enlarged horizontal sectional view of the component parts arranged near the switch of this invention which is operatively connected to the brake pedal.

FIGS. 9 and 10 show the relationship between the switch 141 and the brake pedal 1. In the embodiments of this invention, the connection of the brake pedal with the rod differs from the connection of the brake pedal 1 and the rod 10 shown in FIGS. 1 to 3, namely, the base portion of a forked connecting member 145 is connected to a coupling member 110a which is attached to the right end of the rod 10, while the forked portion of the connecting member 145 is fitted on the brake pedal 1 and a metal plate 148 is slidably fitted on the open end of the forked portion. Also a rubber box member 144 is fitted on the connecting member 145 opposite to the metal plate 148. The box member 144 is formed into a box shape with no lids and sides 144a of the box member 144 are thin and formed into a flexible shape. Numeral 143 designates a cover fastened to the metal plate 148 by a rivet contact 141b. The box member 144 is held in place by nuts 146 screwed onto the fork ends of the connecting member 145. Numeral 141a designates a rivet contact fixedly fitted in the central portion of the bottom of the box member 144 and connected by a wire 142 to the collector of the transistor 73 shown in FIG. 8. Numeral 147 designates a spring for biasing in such a manner that the contacts 141a and 141b are normally kept away from each other. The rod 10 is normally pulled to the left by another spring which is not shown, so that the left end of the contact 141b or the cover 143 is normally kept in contact with the forward end (the right end in the Figure) of the arm of the brake pedal 1. The resilience of the spring 147 and the sides 144a of the box member 144 are set to such values that while even a slight movement of the brake pedal 1 in the depressing direction brings the contacts 141a and 141b into contact with each other, any slight movement of the brake pedal 1 in the releasing direction causes the contacts 141a and 141b to separate from each other. This relationship may be easily established, although it is subject to the effects of the strength of the spring pulling the rod 10 to the left, the forces including the inertia force, the frictional force, etc., which are required for moving the electromagnet, etc., when pulling the rod 10 to the right, the restoring force or the inertia of the brake pedal, etc. The contacts 141a and 141b constitute the switch 141 and the contact 141b is grounded through the connecting member 145 or the brake pedal 1. Numeral 149 designates a stopper for preventing the connecting member 145 from falling downwards and it is fixedly mounted on the brake pedal 1 by means of bolts and nuts.

The operation of the first embodiment of the invention will now be described with reference to FIG. 8.

With the vehicle in motion, when the brake pedal 1 is depressed, the contacts 141a and 141b are first brought into contact with each other and thus the switch 141 formed by these contacts is closed turning the transistor 76 on and the transistor 78 off. Consequently, even if the brake pedal 1 is depressed further so that the microswitch 19 is closed, the electromagnet 17 is not energized. When the vehicle is brought to a complete stop with the brake pedal 1 depressed to an extent greater than a predetermined amount, the speed signal from the reed switch 34 is terminated and the transistor 73 is turned off. After the vehicle has been brought to a complete stop, when the driver lifts his foot off the brake pedal 1, the switch 141 is opened so that the relay 38 is operated and the electromagnet 17 is energized thus locking the brake pedal 1 in the previously depressed position. More specifically, the apparatus of this invention operates as follows. When the foot pressure depressing the brake pedal 1 is reduced in an attempt to lift the foot off the brake pedal 1, the brake pedal 1 tends to return faster than the rod 10 so that the brake pedal 1 is separated from the cover 143 and the switch 141 is opened by the force of the spring 147, thus locking the brake pedal 1 in the previously depressed position by the electromagnet 17. Of course, the brake pedal 1 is locked in the position depressed greater than the predetermined amount and consequently the microswitch 19 remains closed. While this allows the brakes to continue to hold, if it is desired to apply the brakes more firmly, by depressing the brake pedal 1 harder so that the switch 141 is closed by the foot pressure and the relay 38 is deenergized, the brake pedal 1 may be easily depressed further with only a small amount of foot pressure. After the brake pedal 1 has been depressed harder, when the foot is lifted off the brake pedal 1, as mentioned previously, the switch 141 is instantly opened and the electromagnet 17 is energized thus locking the brake pedal 1 in the newly depressed position.

The pre-set resistor 143 serves in such a manner that when the microswitch 28 operatively connected to the clutch pedal 28 and the switch 40 operatively connected to the accelerator pedal are both opened and the electromagnet 17 is deenergized, namely, when the vehicle is started, the electromagnet 17 is attracted with a weak force to the locking plate and in this way the striking sound due to the deenergization of the electromagnet 17 is reduced. The resistance value of the resistor 143 is suitably selected so as to prevent any possibility of the buzzer 38 being grounded through the switch 28 or 40 and the resistor 143 and caused to produce a buzzing sound while the vehicle is in motion.

Figure 11:
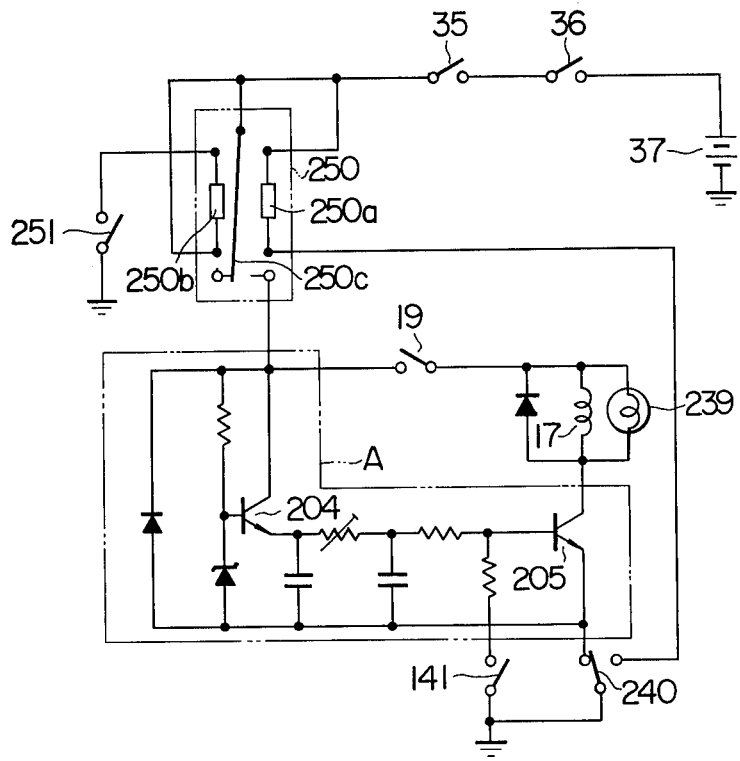
FIG. 11 is a circuit diagram of a second embodiment of the invention.

FIG. 11 is a circuit diagram of a second embodiment of the invention in which the speed detecting circuit is eliminated, wherein an amplifier A having transistors 204 and 205 for energizing the electromagnet 17 and a two-winding latching relay 250 for controlling the supply of current to the amplifier A are connected as shown in the Figure. In this second embodiment, the switch operatively connected to the accelerator pedal is a transfer switch 250 which is changed from the illustrated position in response to the depression of the brake pedal 1.

With the main switch 35 and the key switch 36 closed, when the vehicle is started by depressing the accelerator pedal, the transfer switch 240 is changed from the illustrated position so that forward current flows to one coil 250a of the relay 250 and its contact 250c is changed from the illustrated position and latched in the newly assumed position. Consequently, the amplifier A is connected to the positive terminal of the power source 37. With the vehicle in motion, when the brake pedal 1 is depressed, the switches 141 and 19 of the same construction as the switches 141 and 19 of the first embodiment shown in FIG. 8 are closed. In this case, since the transistor 205 is turned off in response to the closing of the switch 141, the electromagnet 17 is not energized. When the driver lifts his foot off the brake pedal 1, the switch 141 is instantly returned into the position shown in FIG. 11. In this case, since the driver is not stepping on the accelerator pedal so that the switch 240 is placed in the position shown in FIG. 11, the electromagnet 17 is energized and the brake pedal 1 is locked in the previously depressed position. When it is desired to apply the brakes more hardly, the brake pedal 1 is depressed further so that the switch 141 is closed and the electromagnet 17 is deenergized thus allowing the driver to depress the brake pedal 1 easily. In the Figure, numeral 251 designates another microswitch which is operatively connected to the brake pedal 1 and disposed so that it is closed when the brake pedal 1 is depressed fully. Consequently, with the vehicle in motion, when the brake pedal 1 is depressed fully, the microswitch 251 is closed and reverse current flows in the other coil 250b of the two-winding latching relay 250, thus releasing the latch and deenergizing the relay 250. Consequently, the supply of power to the amplifier A is stopped and the electromagnet 17 is deenergized. The microswitch 251 is provided to prevent the risk of a situation arising in which when the running vehicle is braked hard, the brakes continue to hold and the wheels are locked. Numeral 239 designates a lamp for indicating that the electromagnet 17 has been energized.

Figure 12:
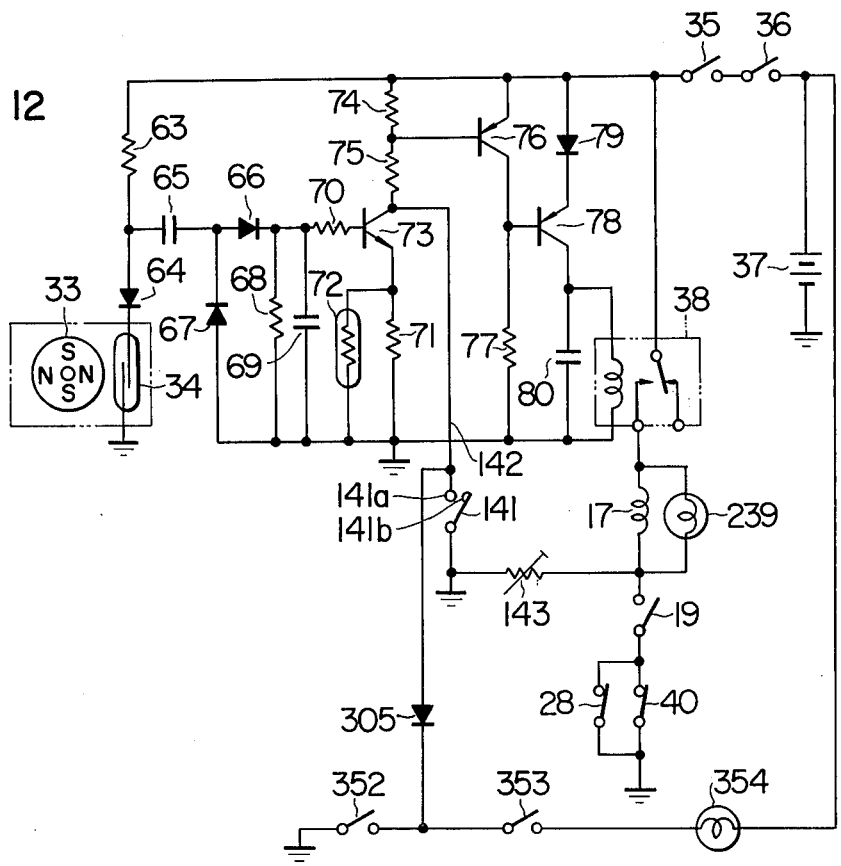
FIG. 12 is a circuit diagram of a third embodiment of the invention.

Next, a third embodiment of the invention will be described with reference to the drawings. FIG. 12 is a circuit diagram of the third embodiment in which the present invention is applied to the prior art braking control apparatus shown in FIGS. 1 to 7, wherein the collector of the transistor 73 is connected to the ground through the switch 141. The collector of the transistor 73 is also grounded by way of a diode 305 and a door switch 352. The door switch 352 is operatively connected to the doors so that it is closed when the door is opened. The junction point of the diode 305 and the door switch 352 is connected to the positive terminal of the power source 37 through a manual room light switch 353 and a room light 354. Connected in parallel with the electromagnet 17 is an indicator lamp 239 having its one end connected to the normally open contact of the relay 38 and its other end grounded through the pre-set resistor 143. The junction point of the electromagnet 17 and the pre-set resistor 143 is connected through the microswitch 19 to one ends of the microswitch 28 and the switch 40 operatively connected respectively to the clutch pedal 27 and the accelerator pedal and the other ends of the microswitch 28 and the switch 40 are grounded. In this embodiment, the buzzer 38 shown in FIG. 7 is eliminated. The remainder of this embodiment is the same with the corresponding circuit construction of FIG. 7. The switch 141 is the same or equivalent to that used in the first and second embodiments shown in FIGS. 8 to 11.

The operation of the third embodiment is as follows. With the vehicle in motion, when the brake pedal 1 is depressed, the contacts 141a and 141b are closed and the switch 141 comprised of these contacts is closed, thus turning the transistor 76 on and the transistor 78 off. Thus, even if the brake pedal 1 is depressed further so that the microswitch 19 is closed, the electromagnet 17 is not energized. When the vehicle is brought to a stop with the brake pedal 1 being depressed, the speed signal from the reed switch 34 is terminated and at the expiration of several seconds thereafter the transistor 73 is turned off. Thereafter, when the driver lifts his foot off, the switch 141 is opened so that the relay 38 is operated and the electromagnet 17 is energized, thus locking the brake pedal 1 in the previously depressed position. Namely, when the driver lifts his foot off the brake pedal 1, the brake pedal 1 tends to return faster than the rod 10 so that the switch 141 is opened by only a slight movement of the brake pedal 1 and thus the brake pedal 1 is locked in the previously depressed position. Of course, the microswitch 19 remains closed. While this causes the brakes to continue to hold, if it is desired to apply the brakes harder, the brake pedal 1 is depressed more hardly so that the switch 141 is closed in response to this brake-pedal pressure and the relay 38 is deenergized. Thus, the electromagnet 17 is deenergized allowing the brake pedal 1 to be easily redepressed further. After the brake pedal 1 has been depressed harder, when the driver lifts his foot off the brake pedal 1, the switch 141 is immediately opened and the electromagnet 17 locks the brake pedal 1 in the newly depressed position. This operation is the same with that described in connection with the first and second embodiments.

In this condition, when the driver opens the door to step out of the vehicle, the door switch 352 is closed so that the transistor 76 is turned on and the transistor 78 is turned off. Thus, the relay 38 is deenergized and the electromagnet 17 is also deenergized thus releasing the brakes.

The pre-set resistor 143 serves in such a manner that when the microswitch 28 and the switch 40 are opened and the electromagnet 17 is deenergized, namely, when the vehicle is started, the electromagnet 17 is attracted with a weak force to the locking plate and in this way the striking sound due to the deenergization of the electromagnet 17 is reduced and the pre-set resistor 143 is of the same type as used in the first embodiment shown in FIG. 8.

Figure 13:
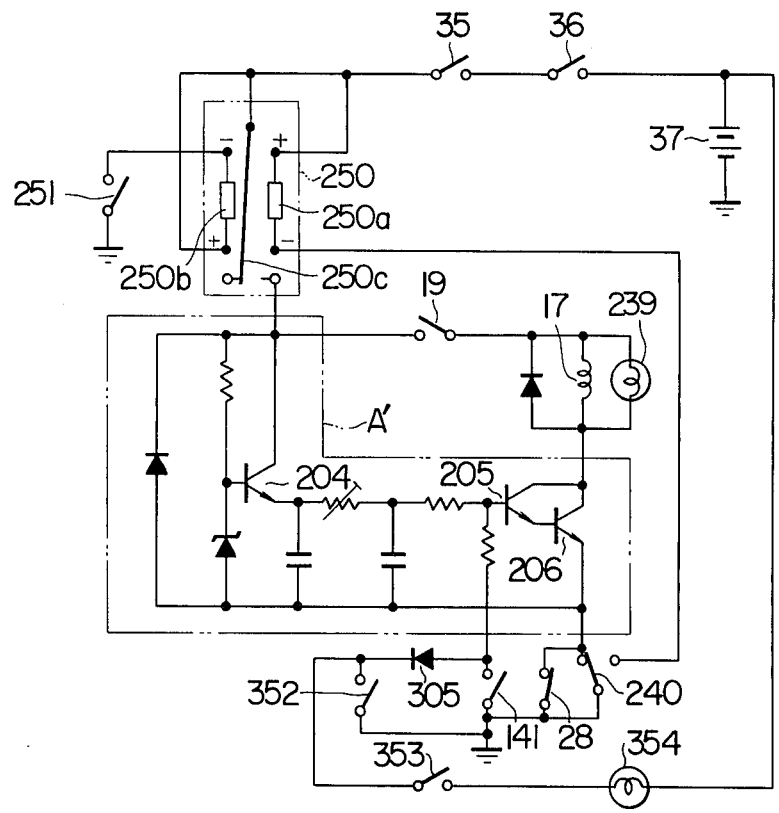
FIG. 13 is a circuit diagram of a fourth embodiment of the invention.

FIG. 13 is a circuit diagram of a fourth embodiment in which the speed detecting circuit is eliminated. More specifically, the mechanism of the circuit of FIG. 12 which deenergizes the electromagnet by the door switch is incorporated in the circuit of FIG. 11. An amplifier A' having transistors 204, 205 and 206 for energizing the electromagnet 17 and the two-winding latching relay 250 for controlling the supply of current to the amplifier A' are connected as shown in the Figure. In this embodiment, the amplifier A' and the two-winding latching relay 250 are the same with those shown in FIG. 11 except that the transistors 205 and 206 are connected in Darlington configuration to provide an improved amplification factor. Of course, these two transistors may be replaced with a single transistor as shown in FIG. 11. The switch 28 is of the same structure with that shown in FIG. 11.

The operation of the fourth embodiment is as follows. With the main switch 35 and the key switch 36 closed, when the accelerator pedal is depressed so that the vehicle is started, the transfer switch 240 is changed from the illustrated position and forward current flows in one coil 250a of the relay 250 thus changing its contact 250c from the illustrated position and holding it in the newly assumed position. Consequently, the amplifier A' is connected to the positive terminal of the power source 37. With the vehicle in motion, when the brake pedal 1 is depressed, the switches 141 and 19 are closed so that the transistors 205 and 206 are turned off in response to the closing of the switch 141 and the electromagnet 17 is not energized. However, when the foot is lifted off the accelerator pedal deenergizing the swtich 240 and then the foot is lifted off the brake pedal 1 instantaneously deenergizing the switch 141, the electromagnet 17 is energized and the brake pedal 1 is locked in the previously depressed position. When it is desired to apply the brakes harder, the brake pedal 1 is depressed further so that the switch 141 is closed and the electromagnet 17 is deenergized thus allowing the driver to depress the brake pedal 1 easily. In the Figure, numeral 251 designates another microswitch which is operatively connected to the brake pedal 1 and disposed so that it is closed when the brake pedal 1 is depressed fully. As a result, with the vehicle in motion, when the brake pedal 1 is depressed fully, the microswitch 251 is closed and reverse current flows in the other coil 250b of the two-winding latching relay 250, thus releasing the latch and deenergizing the latching relay 250. Consequently, the supply of power to the amplifier A' is stopped and the electromagnet 17 is deenergized. The microswitch 251 is provided to prevent the danger of the brakes applied hard on the running vehicle being allowed to continue to hold and thus locking the wheels. The operation of the door switch 352 which results in releasing the brakes will not be described since it is the same with that described in connection with the third embodiment shown in FIG. 12.

Figure 14:
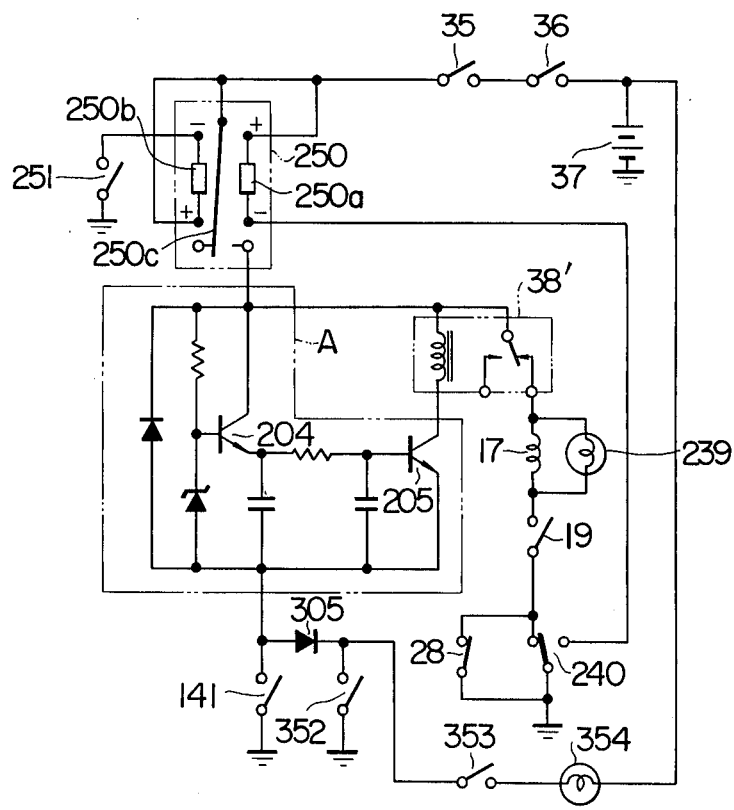
FIG. 14 is a circuit diagram of a fifth embodiment of the invention.

Referring to FIG. 14, there is shown a fifth embodiment of the invention which is a slightly modified form of the fourth embodiment shown in FIG. 13. This embodiment differs from the fourth embodiment of FIG. 13 in that the electromagnet 17 is energized by a relay 38' inserted in the collector circuit of the transistor 205 and the place of connection of the switches 141 and 251 are slightly changed. The operation of this embodiment on the whole is the same with that of the fourth embodiment shown in FIG. 13 and the circuit construction of this embodiment may readily be understood from the Figure. Thus, they will not be described. In the case of a vehicle such as a torque converter-equipped vehicle having no clutch pedal, the switch 28 is not needed.

Figure 15:
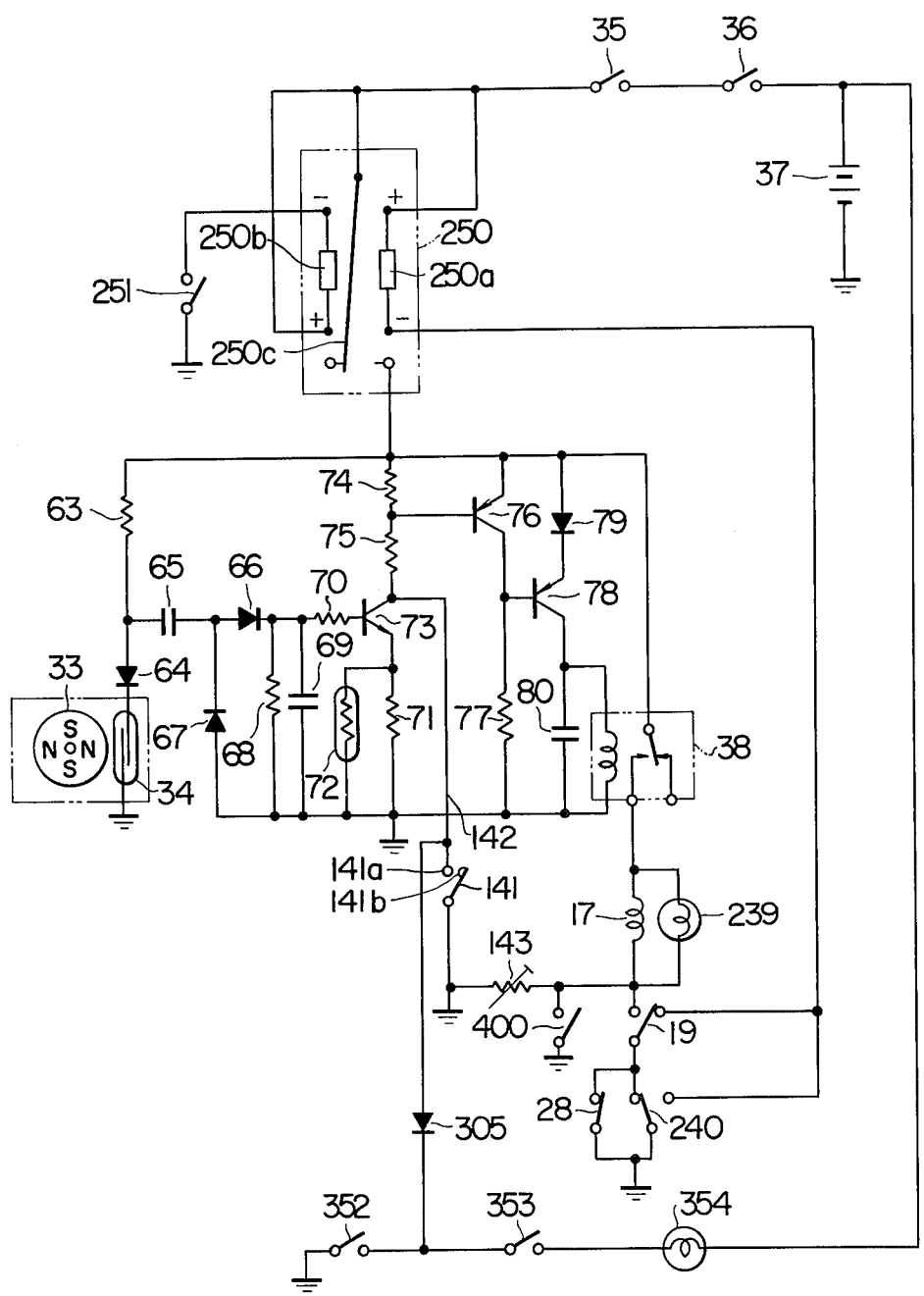
FIG. 15 is a circuit diagram of a sixth embodiment of the invention.

FIG. 15 shows a sixth embodiment of this invention. In the embodiment, a single-pole double-throw type microswitch 19' is used instead of the single-pole single-throw type microswitch 19 of the fifth embodiment as shown in FIG. 14. The normally open contact of the microswitch 19' is connected to an electromagnet 17, while the normally closed contact thereof is connected to the negative terminal of one coil 250a of a latching relay 250. Further, in the embodiment a switch 400 is connected between the electromagnet 17 and the ground. The switch 400 is actuated in accordance with the positions of the shift lever of a vehicle, and, in this embodiment, it closes only when the shift lever is in the neutral position.

In the Figure, the component elements designated by the same reference numerals as in FIGS. 12 and/or 13 are identical or equivalent in construction and function with the corresponding elements of FIGS. 12 and/or 13.

The sixth embodiment is intended to provide a better driving operation of a vehicle when, for example, the vehicle is climbing down on a steep downhill road. Namely, if an emergency brake is applied on such a downhill road, the microswitch 251 is closed and a reverse current flows in the other coil 250b of the latching relay 250, thus releasing the latch and deenergizing the latching relay 250, as mentioned earlier. Thereafter, in this embodiment, when the driver's foot is lifted off the brake pedal 1, the coil 250a of the relay 250 is energized by the actuation of the microswitch 19', whereby the relay 250 is latched. In other words, only if the driver's foot is lifted off the brake pedal after an emergency braking on a downhill road, the vehicle can start to climb down the downhill road by its gravity without necessitating the depressing of an accelerator pedal as in the other embodiments. Of course, in the embodiment the relay 250 can be latched also by the depressing of the accelerator pedal.

The switch 400 is provided to lead one terminal of the electromagnet 17 to the ground irrespective of the states of the switches 19, 28 and 240 when the shift lever is positioned neutral.

The other operations of the sixth embodiment will not be described since it may readily be understood from the description of the other embodiments and figures.

While, in some embodiments of the invention described hereinabove, a reed switch is used to constitute a part of the vehicle speed detecting means, of course the reed switch may be replaced with any other semiconductor switch such as a Hall device. Further, while the switch attached to the accelerator pedal, brake pedal and clutch pedal, respectively, comprises a mechanical switch using a coil spring, of course the switch may be replaced with any other solid-state switch such as a pressure sensitive diode switch or proximity switch.

I claim:

1. A braking control apparatus for a vehicle comprising:

an electromagnet and a locking plate attractable to said electromagnet, one of said electromagnet and said locking plate being fixedly attached to a vehicle and the other thereof being fixedly attached to a connecting rod responsive to the movement of a brake pedal of said vehicle, said electromagnet and said locking plate being slidable relative to each other in accordance with the amount of depression of said brake pedal when said electromagnet is deenergized, and said electromagnet attracting said locking plate to lock said brake pedal in any given depressed position of said brake pedal when said electromagnet is energized;

first brake pedal switch means inserted in an electric closed circuit including said electromagnet and a power source, said first brake pedal switch means being mounted to said vehicle and operable in response to the movement of said brake pedal so as to be closed when said brake pedal is depressed in excess of a predetermined amount;

amplifier means having switching means inserted in said electric closed circuit including said electromagnet and said power source;

second brake pedal switch means mounted to said vehicle to be operable in response to the movement of said brake pedal and electrically connected to said amplifier means, said second brake pedal switch means closing in response to the depression movement of said brake pedal to deenergize said switching means of said amplifier means, and said second brake pedal switch means opening in response to the backward movement of said brake pedal to disconnect said amplifier means with said second brake pedal switch means; and accelerator pedal switch means mounted to said vehicle to be operable in response to the movement of an accelerator pedal of said vehicle and inserted in said electrically closed circuit including said electromagnet and said power source, said accelerator pedal switch means opening in response to the depression of said accelerator pedal.

2. An apparatus according to claim 1, further comprising clutch pedal switch means mounted to said vehicle to be operable in response to the movement of a clutch pedal of said vehicle and connected in parallel with said accelerator pedal switch means, said clutch pedal switch means closing in response to each of an initial and final position of said brake pedal in the depression stroke thereof, and said clutch pedal switch means opening in response to an intermediate position of said clutch pedal between said initial and final positions.

3. An apparatus according to claim 1, wherein said second brake pedal switch means includes:
- a connecting member coupled to said connecting rod and having a forked cutout part for receiving therein said brake pedal, said forked cutout part having an open end located on a side in which said brake pedal is depressed;
- a normally open switch mounted in said open end of said forked cutout part to close in response to the depression of said brake pedal; and
- a spring disposed to bias said brake pedal and an actuator of said normally open siwtch into contact with each other.

4. An apparatus according to claim 1, further comprising door switch means connected in parallel with said second brake pedal switch means and disposed to be closed when any one of doors of said vehicle is opened.

5. An apparatus according to claim 4, wherein said door switch means includes a series circuit of a door switch responsive to the opening of any one of the doors of said vehicle to close and turn on a room light and a diode for preventing the flow of current from a circuit including said room light to said amplifier means.

6. An apparatus according to claim 1, further comprising:
- latching relay means connected to said amplifier means, said power source and said accelerator pedal switch means, whereby in response to the depression of said accelerator pedal said accelerator pedal switch means energizes said latching relay means in one direction to thereby energize said amplifier means; and
- third brake pedal switch means mounted to said vehicle to be operable in response to the movement of said brake pedal and electrically connected to said latching relay means, said third brake pedal switch being responsive to the movement of said brake pedal for rapid braking for energizing said latching relay means in the other direction to deenergize said amplifier means.

7. An apparatus according to claim 1, further comprising a variable resistor connected in parallel with said accelerator pedal switch means for supplying a limited energizing current of a predetermined amount to said electromagnet when said accelerator pedal switch means is opened.

8. An apparatus according to claim 1, further comprising an indicator lamp connected in parallel with said electromagnet to be turned on when said electromagnet is energized.

9. An apparatus according to claim 1, wherein said switching means of said amplifier means includes a plurality of transistors connected in Darlington configuration.

10. A braking control apparatus for a vehicle comprising:
- vehicle speed detecting means including a magnet rotatable in accordance with the running speed of a vehicle, and a reed switch disposed adjacent to said magnet to be opened and closed in response to the rotation of said magnet;
- an electromagnet and a locking plate attractable to said electromagnet, one of said electromagnet and said locking plate being fixedly attached to said vehicle and the other thereof being fixedly attached to a connecting rod operatively connected to a brake pedal of said vehicle, said electromagnet and said locking plate being slidable relative to each other in accordance with the amount of depression of said brake pedal when said electromagnet is deenergized, and said electromagnet attracting said locking plate and locking said brake pedal in any given depressed position of said brake pedal when said electromagnet is energized;
- first brake pedal switch means inserted in an electric closed circuit including said electromagnet and a power source and mounted to said vehicle to be operable in response to the movement of said brake pedal, whereby said first brake pedal switch means is closed when said brake pedal is depressed in excess of a predetermined amount;
- an amplifier circuit connected to said vehicle speed detecting means and including a transistor in the final stage thereof, said final stage transistor being responsive to the signal from said vehicle speed detecting means, whereby said final stage transistor is turned off when said vehicle is moving, while said final stage transistor is turned on when said vehicle is at rest;
- second brake pedal switch means mounted to said vehicle to be operable in response to the movement of said brake pedal and electrically connected to said amplifier circuit, said second brake pedal switch means closing in response to the depression movement of said brake pedal to turn off said final stage transistor independently of the signal from said vehicle speed detecting means, and said second brake pedal switch means opening in response to the backward movement of said brake pedal to disconnect said amplifier circuit with said second brake pedal switch means;
- a relay circuit connected to said amplifier circuit and said electromagnet and having relay contacts inserted in said electrically closed circuit including said electromagnet and said power source, said relay contacts closing in response to the turning off of said final stage transistor, and said relay contacts opening in response to the turning on of said final stage transistor;
- accelerator pedal switch means mounted to said vehicle to be operable in response to the movement of an accelerator pedal of said vehicle and inserted in said electric closed circuit including said electromagnet and said power source, whereby said accelerator pedal switch means is opened in response to the depression of said accelerator pedal;
- door switch means connected in parallel with said second brake pedal switch means and disposed to be closed in response to opening of any one of doors of said vehicle;
- latching relay means connected to said amplifier circuit, said power source and said accelerator pedal switch means, whereby in response to the depression of said accelerator pedal said accelerator pedal switch means energizes said latching relay means in one direction to energize said amplifier circuit; and
- third brake pedal switch means mounted to said vehicle to be operable in response to the movement of said brake pedal and electrically connected to said latching relay means, said third brake pedal switch means being responsive to the movement of said brake pedal depressed for rapid braking to energize said latching relay means in the other direction and thereby to deenergize said amplifier circuit.

* * * * *